United States Patent [19]

Van Horn

[11] 3,976,852

[45] Aug. 24, 1976

[54] WELDING TORCH

[75] Inventor: Charles A. Van Horn, York, Pa.

[73] Assignee: Chemetron Corporation, Chicago, Ill.

[22] Filed: Aug. 20, 1975

[21] Appl. No.: 606,061

[52] U.S. Cl. ............................... 219/75; 174/15 WF; 219/138; 219/144; 279/1 T; 279/20; 403/223
[51] Int. Cl.² ......................................... B23K 9/28
[58] Field of Search ............... 64/1 R, 1 S, 1 V, 2 R, 64/2 P, 1 C; 219/75, 138, 142, 144; 279/1 SG, 1 T, 1 R, 20, 23; 403/223, 229, 291; 174/91, 15 C, 15 WF

[56] References Cited
UNITED STATES PATENTS

| | | | |
|---|---|---|---|
| 1,577,489 | 3/1926 | Peck | 219/138 |
| 1,705,964 | 3/1929 | Dempsey | 174/91 |
| 2,063,467 | 12/1936 | Southgate | 219/75 |
| 2,422,265 | 6/1947 | Squires | 219/138 |
| 2,539,610 | 1/1951 | Bunch | 279/23 X |
| 3,217,134 | 11/1965 | Audric | 219/75 |
| 3,294,427 | 12/1966 | Hunt | 279/1 R X |
| 3,594,609 | 7/1971 | Vas | 219/75 X |

FOREIGN PATENTS OR APPLICATIONS

| | | | |
|---|---|---|---|
| 1,295,973 | 5/1969 | Germany | 279/1 SG |

*Primary Examiner*—Arthur T. Grimley
*Assistant Examiner*—N. D. Herkamp
*Attorney, Agent, or Firm*—N. M. Esser

[57] ABSTRACT

An electric welding torch adapted to hold an electrode comprises a helically fluted tube made of flexible material and adapted to surround a portion of the electrode inserted in the tube. Means is provided for mounting the tube in the torch and permitting relative rotation of displaced portions of the tube along the electrode for selectively holding the electrode in the tube by physical engagement of helical land portions of the tube against the surface of the electrode and for releasing the electrode by twisting of the tube in a direction opposite that of the spiral flutes or by application of axial compression of the tube.

10 Claims, 3 Drawing Figures

WELDING TORCH

BACKGROUND OF THE INVENTION

1. Field of the Invention

The present invention relates to an electric welding torch generally and particularly to torches adapted for use in the MIG, TIG and plasma welding processes. In welding processes of the type described, a welding torch is provided for holding a non-consumable electrode generally of thoriated tungsten or other appropriate material and an electric arc is generated between the end of the electrode and the work piece with the arc being shielded by a gas of suitable type passed around the arc from the torch.

2. Description of the Prior Art

Electric welding torches employing non-consumable electrodes and useful in the MIG, TIG and plasma welding processes from time to time require replacement and/or adjustment of the position of the non-consumable electrode used in the torch. In prior torches, various different means such as radially split annular clamping rings have been used for holding the electrode in place during the welding process. Many prior art torches suffer from the difficulty of requiring too much operator time for making replacement of a non-consumable electrode or for position adjustment of the electrode in the torch as the electrode is gradually eroded away during the welding process. Many prior art torches utilize electrode clamping systems for holding and making electrical contact with the electrodes which do not readily lend themselves to providing suitable high amperage electrical contact with the electrode. In addition, these torches do not provide an efficient gas passage for the shielding gas as it flows out towards the outer end of the electrode to form a shield around the welding arc. Many prior art welding torches are mechanically complex, expensive, and do not have a capacity to provide a high current density when a minimum diameter electrode is used. Moreover, often times replacement or adjustment of the position of the electrode is difficult and cumbersome.

SUMMARY OF THE INVENTION

It is an object of the present invention to provide a new and improved electric welding torch of the character described and more particularly, it is an object to provide a welding torch having a new and improved means for electrically contacting and mechanically securing an electrode in the torch in a manner capable of high current density application.

Another object of the present invention is to provide an electric welding torch of the type described having a simple and fool-proof system for positively securing an electrode in place in the torch yet capable of rapidly and easily releasing the electrode so that another electrode may be inserted or its position adjusted without requiring long interruptions in the welding process.

Another object of the present invention is to provide a new and improved electric welding torch of the character described having novel means for imparting a helical flow of gas toward the welding arc providing a very stable gas shield ideally suitable for use in MIG, TIG and plasma welding processes.

Another object of the present invention is to provide a new and improved electric welding torch of the type described wherein a helically fluted tube is provided for mechanically gripping the electrode and for supplying electrical current to the electrode for the welding arc.

Another object of the present invention is to provide a new and improved electric welding torch of the character described wherein a helically fluted tube mechanically supporting the electrode is efficiently used to provide a helical gas conduit and a helical coolant conduit for the torch.

Another object of the present invention is to provide a new and improved electric welding torch of the character described which includes an efficient electrode holding system also providing electrical contact for the welding current supplied to the electrode and providing a gas conduit and a coolant conduit for the torch.

Another object is to provide a torch having a maximum current density capability even with a minimum diameter electrode.

Another object of the present invention is to provide a new and improved electric welding torch wherein the electrode can be rapidly released and replaced and can be adjusted in position in an easy and rapid manner as desired.

The foregoing and other objects and advantages of the present invention are accomplished in an illustrative embodiment comprising an electric welding torch adapted for holding an electrode including in combination, a helically fluted tube made of flexible material adapted to surround a portion of the electrode inserted in the tube. Means is provided for mounting the tube in the torch and permitting relative rotation of displaced portions of the tube along the electrode for selectively holding the electrode in the tube by physical contact between helical portions of the tube and the surface of the electrode. An easy and rapid release of the electrode for replacement or adjustment is provided by the design which permits twisting of the tube in a direction opposite the helical flutes or by axial compression of the tube thereby slightly enlarging the inside diameter of the helical flute so that the electrode is released from holding contact therewith.

DESCRIPTION OF THE PREFERRED EMBODIMENT

Figure 1:
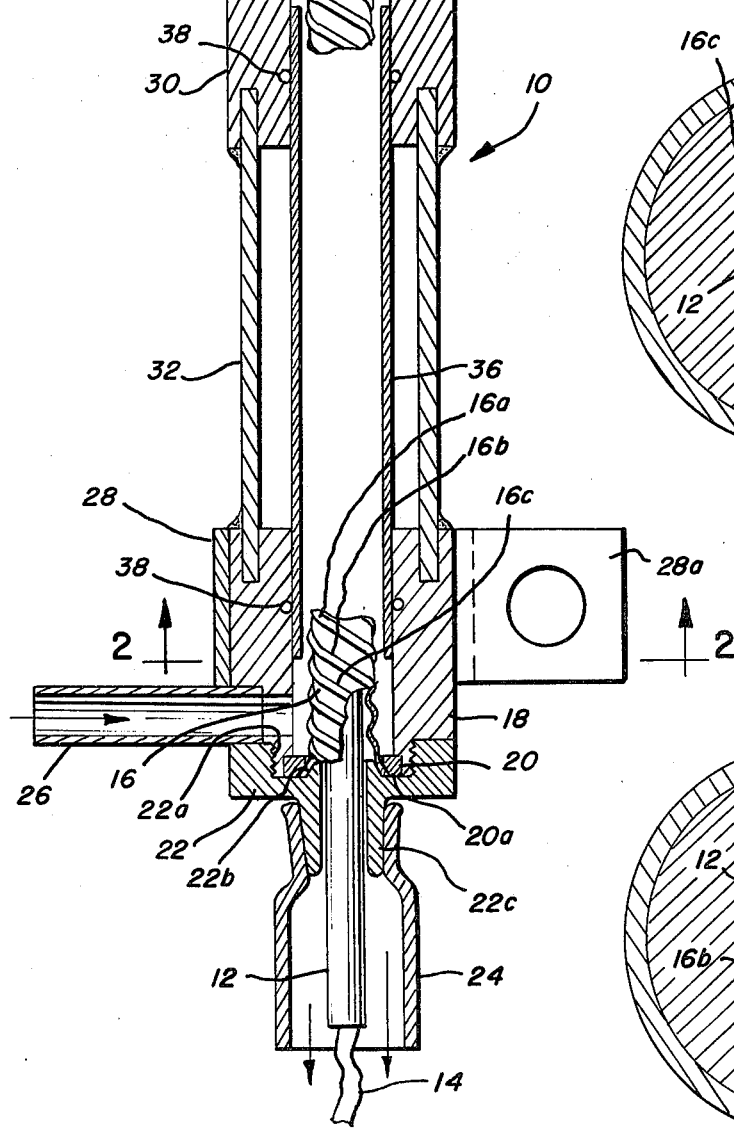
FIG. 1 is a longitudinal sectional view of a new and improved electric welding torch constructed in accordance with the features of the present invention.

Referring now more particularly to the drawings, therein is illustrated a new and improved electric welding torch referred to generally by the reference numeral 10 and adapted to hold an elongated non-consumable thoriated tungsten electrode 12 for use in MIG, TIG, and plasma welding processes.

In these welding processes, a high current density electric arc 14 is struck between an outer end of the non-consumable electrode 12 and a work piece (not shown). The arc 14 is normally shielded by an envelope of shielding gas as may be required by the particular welding process. The uses of shielding gas in various processes are known and need not be described further. While the tungsten electrode 12 is considered a non-consumable electrode, the outer end portion of the electrode is gradually eroded away during the welding processes and the electrode must be advanced outwardly in the torch from time to time so that an efficient arc is maintained.

The torch 10 is adapted to releasibly and securely hold the electrode 12 and for this purpose includes a helically fluted tube 16 preferably formed of electrically conductive flexible material such as seamless copper tubing.

Figure 2:
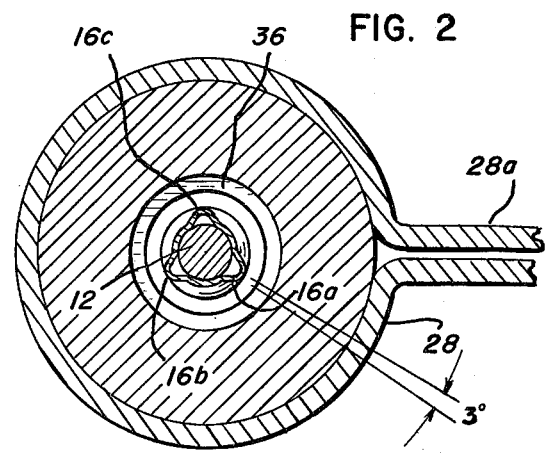
FIG. 2 is an enlarged fragmentary sectional view taken substantially along lines 2—2 of FIG. 1.
Figure 3:
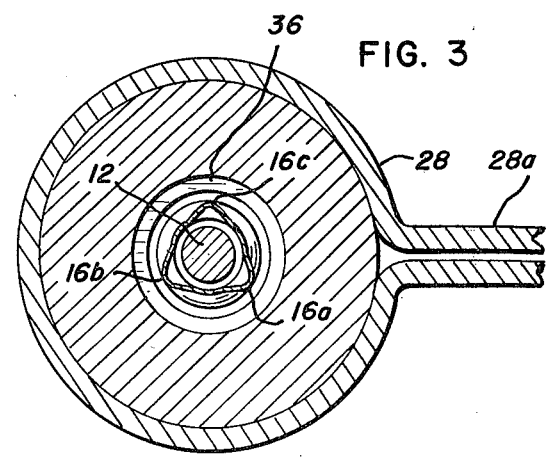
FIG. 3 is a sectional view similar to FIG. 2, but showing the helically fluted tube of the torch in an electrode releasing condition.

Preferably, the tube includes a plurality of helical flutes 16a, 16b and 16c (FIGS. 1, 2 and 3) extending between opposite end portions of the tube with a nominal inside diameter of the flutes approximately equal to the outer diameter of the electrode 12 which is used in the torch as best shown in FIG. 2. When an electrode is inserted into the holding tube 16 a plurality of helical gripping areas are established between the inside surfaces of the flutes on the tube and the outer surface of the electrode. This gripping contact extends for a substantial length of the electrode and provides for secure mechanical holding of the electrode in coaxial alignment within the tube.

As shown in FIG. 1, the forward end of the tube is secured to a hollow tubular coolant inlet jacket 18 by means of an annular ring 20 having a conically beveled inner surface 20a which bears against a flared end portion of the holding tube. A tubular nozzle structure 22 having an internally threaded portion 22a and a beveled surface 22b matching that of the ring is provided and secures the flared end of the tube in place. Both the coolant inlet jacket 18 and the nozzle structure 22 have an axial bore for receiving the electrode 12 and the nozzle structure is formed with an outwardly protruding frustro-conical section 22c on which is supported a tubular outer welding gas nozzle 24 which surrounds the outer end portion of the electrode and helps to contain and shape the flow of gas forming the gas shield around the arc and weld area. Cooling fluid (normally water) is supplied to the coolant inlet jacket 18 through a radially outwardly extending inlet fitting 26 and flows into the interior bore of the inlet jacket and begins to spiral around the outer surface of the helical flutes on the tube 16 towards the opposite end.

The torch 10 is especially well suited for high current density applications and welding current is supplied to the torch through a power strap 28 having an outwardly extending radial lug 28a for attachment to a current source. Current flows between the inside surface of the power strap wrapped around the outer surface of the inlet jacket 18 and from the inlet jacket through the annular ring 20 into the flared outer end of the holding tube 16. The welding current flows from the holding tube into the electrode 12 through a relatively large contact area established between the inner surfaces of the helical flutes 16a, 16b and 16c and the outer surface of the electrode. Contact is established along plural helical paths extending substantially the entire length of the fluted tube with the outer surface of the electrode 12. Accordingly, even with an electrode of minimum diameter the torch 10 is capable of extremely high current densities.

The welding torch includes an annular coolant outlet jacket 30 spaced longitudinally of the tube 16 from the coolant inlet jacket 18 and the jackets are interconnected by an elongated tubular housing or sleeve 32 which is attached to the water jackets by suitable means such as welding or brazing and the like. Each of the coolant jackets includes an axial bore slightly larger in diameter than the outer diameter of the helically fluted tube 16 and the outlet jacket is formed with a radial passage to accommodate a radially outwardly projecting coolant outlet fitting 34 to carry away the coolant fluid introduced to the torch through the inlet fitting 26 at the forward end. An inner sleeve 36 in coaxial alignment with the sleeve 32 between the fittings 18 and 30 is mounted to closely surround the helically fluted tube 16 and this sleeve and the outer surfaces of the helical flutes define a coolant passage comprising a plurality of helical coolant conduits extending between the inlet fitting 18 and the outlet fitting 30 around the tube 16. Opposite outer end portions of the inner sleeve 36 are sealed against the inner surface of the axial bore of the inlet and outlet fittings by means of O-rings 38. The coolant conduit directs the coolant fluid (normally water) to flow through the torch to provide cooling and the flow direction is countercurrent relative to the direction of gas flow through the torch as will be described in detail hereinafter.

An outer end portion of the outlet jacket 30 is provided with external threads 30a and an enlarged bore section 30b and a tubular, hollow bearing hub 40 is mounted in the enlarged bore section with an O-ring 42 provided to seal between the outer surface of the bearing hub and the inside surface of the bore to prevent the leakage of coolant fluid from the end of the coolant conduit. A coaxial, hollow bearing housing 44 is threaded onto the threaded outer end section 30a of the outlet jacket 30 to enclose the bearing hub 40 and provide an internal bearing chamber (indicated by the reference numeral 44a) for the end of the helically fluted tube 16. An annular ball bearing unit 46 is mounted in the bearing chamber with the outer race of the bearing unit seated in a shouldered recess formed in the wall of the bearing housing. The inner race of the bearing unit is seated in a facing shouldered recess formed in the outer surface of the bearing hub 40 (as best shown in FIG. 1). The bearing unit 46 permits free relative rotation between the bearing hub 40 and the bearing housing 44 which is threaded to the end of the outlet jacket 30 of the torch body. The bearing unit is retained in place on the bearing hub by means of an annular bearing cap 48 secured to the outer end of the bearing hub by a plurality of cap screws 50. A removable bearing housing cap 52 is attached to the open outer end of the bearing housing 44 by means of a plurality of cap screws 54 and the bearing housing cap is formed with a threaded central aperature 52a for receiving a gas supply conduit (not shown) for supplying gas to the welding torch. The gas passes into the bearing chamber 44a and moves through the hollow bore of the bearing hub 40 which is slightly larger in diameter than the outer diameter of the electrode 12 which projects into the bore. The bore of the hub is formed with an enlarged, shouldered portion 40a adjacent the inner end in order to accommodate a hollow tube insert 56 secured to an end portion of the helically fluted tube 16 by brazing or the like. The gas introduced into the torch 10 passes through a helical gas conduit comprising a plurality of helical passages defined between the outer surface of the electrode 12 and the inner portions of the helical flutes 16a, 16b and 16c of the holding tube 16. As the gas flows down the torch (as viewed in FIG. 1) a helical motion is imparted and the spinning gas flows outwardly around the outer end portion of the electrode through the outlet nozzle section 22c and welding nozzle 24 to form a stable, spinning gas shield around the arc 14 and weld area. Because of the helical gas flow pattern, the gas shield is extremely stable and provides for an extremely high quality weld.

The helical flutes 16a, 16b and 16c of the electrode holding tube 16 not only define and provide a helical gas conduit for the shielding gas but also provide a helical path for the coolant fluid on the outside of the tube and these two fluids preferably move in opposite directions along the torch. This countercurrent flow arrangement provides an advantage in that the shielding gas is heated as it moves towards the outer end of the electrode and the coolant fluid absorbs the heat from the hottest end of the torch near the arc. The coolant fluid moves from the hotter outer end portion of the torch and flows in a direction opposite to the gas until reaching the outlet jacket 30 and passing out of the torch through the outlet fitting 34.

The short tube insert 56 attached to the end of the helically fluted tube 16 is pressed fitted into the large bore section 40a of the bearing hub 40 and secured to rotate therewith. Accordingly, rotation of the hub in the bearing assembly 46 relative to the fixed forward end of the holding tube 16 is permitted while maintaining precise coaxial alignment between the holding tube around the electrode 12 inserted therein.

In a torch constructed in accordance with the present invention, the helically fluted electrode holding tube is formed of hard drawn, seamless copper tube with three or more helical flutes therein. Preferably, the copper tube 16 is formed of an iron or beryllium bearing copper alloy to provide a good spring rate. The tube is approximately 6 inches long and has a nominal wall thickness of .020 inch. Helically fluted tubes of this type are manufactured by the Spiral Tubing Corporation of New Britain, Connecticut, and are sold under the trademark "TUBOTEC". The torch 10 was constructed to accommodate a non-consumable thoriated tungsten electrode having an outer diameter of approximately one quarter inch for carrying a maximum welding current of approximately 1000 amperes. By turning the bearing hub 40 and consequently the end of the helically fluted tube 16 relative to the fixed lower end of the tube by approximately three degrees of rotation about the longitudinal axis, the electrode 12 is released from holding contact with the tube and is easily withdrawn from the torch. By twisting the helically fluted tube about three degrees in a direction opposite to that of the helical flutes, the electrode 12 is releasable and a new electrode can be installed or adjustment of the position of the electrode longitudinally in the torch can easily be accomplished. Once a new electrode is installed or the electrode is repositioned as desired, the tube 16 is twisted back and the electrode is then firmly held in place. Release of the electrode is also available by axial compression on the helically fluted tube 16 with the application of pressure against the bearing cap 48. This also enlarged the inner diameter of the tube slightly for permitting the withdrawal of the electrode or axial adjustment of position of the electrode in the tube. When the end pressure on the bearing cap is released an electrode in the tube is again firmly secured in position.

From the foregoing it is clear that the torch 10 constructed in accordance with the present invention provides for easy and rapid removal and replacement of an electrode or adjustment of the axial position of an electrode in the torch. In addition, the unique construction of the torch provides a helical gas conduit for spinning the gas flow and results in an extremely stable, inert gas shield formed around the welding arc. Moreover, the helically fluted electrode holding tube of the torch also provides for an efficient and large area of electrical contact between the tube and the electrode so that high current densities can be used. The helically fluted tube also conveniently provides in combination with the sleeve 36 a helical coolant conduit for water or other coolant.

Although the present invention has been described with reference to a single illustrative embodiment thereof, it should be understood that numerous other modifications and embodiments can be devised by those skilled in the art that will fall within the spirit and scope of the principles of this invention.

What is claimed as new and desired to be secured by Letters Patent of the United States is:

1. In an electric welding torch adapted to hold an electrode, a combination comprising:
   a helically fluted tube made of flexible material and adapted to surround a portion of an electrode inserted in said tube, and
   means for mounting said tube in said torch and permitting relative rotation of displaced portions of said tube along said electrode for selectively holding said electrode in said tube by physical engagement of helical portions of said tube with said electrode and releasing said electrode.

2. The combination of claim 1 wherein said tube is formed of electrically conductive material providing electrical contact between helical portions of said tube and said electrode when said electrode is being held in said tube.

3. The combination of claim 2 wherein said tube and said electrode form a helical gas conduit along said electrode, and further comprising means for introducing a gas into said gas conduit.

4. The combination of claim 3 further including a sleeve mounted in said torch, said sleeve surrounding a portion of said tube forming a helical coolant conduit between said tube and said sleeve, and means for introducing a coolant into said coolant conduit.

5. The combination of claim 4 wherein said means for introducing a gas into said gas conduit and said means for introducing a coolant into said coolant conduit are displaced along said tube for directing said gas and said coolant in opposite directions relative to said tube.

6. The combination of claim 1 wherein said tube and said electrode form a helical gas conduit along said electrode and further comprising means for introducing a gas into said gas conduit.

7. The combination of claim 1 further including a sleeve mounted in said torch, said sleeve surrounding a portion of said tube to form a helical coolant conduit between said sleeve and said tube, and means for introducing a coolant into said coolant conduit.

8. The combination of claim 1 wherein said means for mounting said tube in said torch comprises a bearing supporting a portion of said tube within said torch and permitting relative rotation of said portion of said torch.

9. The combination of claim 8 wherein said means for mounting said tube in said torch further comprises means for securing another portion of said tube against rotation relative to said torch.

10. The combination of claim 1 wherein said helically fluted tube includes a plurality of helical flutes, each of said flutes providing a helical contact portion for engagement with an electrode inserted in said tube.

* * * * *